United States Patent [19]

Clemens et al.

[11] Patent Number: 5,169,617
[45] Date of Patent: Dec. 8, 1992

[54] METHOD OF TREATING PRODUCED GYPSUM

[75] Inventors: Paul Clemens, Schoeneiche; Ellen Wanzura, Ruedersdorf; Guenter Fietsch, Dessau; Helmut Meyer, Schoeneiche; Detlef Kunze, Sandersdorf; Hans-Juergen Hartmann; Wolfgang Schnelle, both of Dessau, all of Fed. Rep. of Germany

[73] Assignee: Ruedersdorfer Zement GmbH, Ruedersdorf, Fed. Rep. of Germany

[21] Appl. No.: 654,175

[22] Filed: Feb. 12, 1991

[30] Foreign Application Priority Data

Feb. 19, 1990 [DD] German Democratic Rep. ... 337952

[51] Int. Cl.$^5$ .................. C01F 11/46; C04B 11/02
[52] U.S. Cl. .................... 423/555; 423/171; 423/172; 423/176; 106/705; 106/775; 106/786; 106/782
[58] Field of Search .............. 423/170, 171, 172, 555, 423/637, 438, 173, 174, 175, 176, 177; 106/705, 775, 782, 786

[56] References Cited

U.S. PATENT DOCUMENTS

| | | |
|---|---|---|
| 383,957 | 6/1888 | Leffmann .................... 423/637 |
| 801,874 | 10/1905 | Hirt .......................... 423/637 |
| 3,650,689 | 3/1972 | Cafferata .................... 423/555 |
| 3,789,111 | 1/1974 | Chaurand et al. ............. 423/555 |
| 4,247,518 | 1/1981 | Charlot et al. ............... 423/555 |
| 4,581,830 | 4/1986 | Risenby et al. ................ 34/57 |
| 4,748,010 | 5/1988 | Walker ....................... 423/175 |

FOREIGN PATENT DOCUMENTS

| | | |
|---|---|---|
| 2622994 | 12/1976 | Fed. Rep. of Germany . |
| 2727544 | 1/1979 | Fed. Rep. of Germany . |
| 3721421 | 1/1989 | Fed. Rep. of Germany . |
| 263048 | 12/1988 | German Democratic Rep. . |

*Primary Examiner*—Gary P. Straub
*Attorney, Agent, or Firm*—Jordan and Hamburg

[57] ABSTRACT

A method for treating produced gypsum and, in particular, a method for treating flue-gas desulfurization gypsum forms highly active, modifiable gypsum binders of high strength with simultaneously drying, deagglomerating and dehydrating. Pursuant to the invention, produced gypsum (flue-gas desulfurization gypsum), with a particle size ranging up to 200 μm, to which 10% by weight of milled natural gypsum is optionally added, is dehydrated at a material temperature of 335° to 363° K. and at a pressure ranging from 2.5 to 8 kpa, the dehydration being concluded when anhydrite III constitutes 50% to 100% by weight.

14 Claims, No Drawings

METHOD OF TREATING PRODUCED GYPSUM

BACKGROUND OF THE INVENTION

The present invention relates to a method for treating produced gypsum and, in particular, to a method for treating flue-gas desulfurization gypsum to form highly active, modifiable gypsum binders in high strength.

It is well known that burning facilities of the gypsum industry for the treatment of natural gypsum are used primarily to dehydrate this type of gypsum.

It is repeatedly pointed out in the literature that flue-gas desulfurization gypsum, before it is dehydrated, must be converted into a product similar to natural gypsum. This means that expensive drying and compacting in a roller press are required. In addition, the known methods usually must provide facilities for cooling the dehydrated product.

Since the produced gypsum, dehydrated with the known methods, has processing properties which deviate disadvantageously from those of conventional gypsum binders, such as thixotropy or sedimentation, compensation for these deficiencies is aimed for by an expensive after-treatment, such as an aging or milling treatment or the addition of additives.

An indirectly heated tubular drier at 403° to 453° K. is provided in accordance with DD-WP 263 048 to control the dust and quality problems when dewatering finely-grained gypsum. However, with such a drier, the product is exposed to residence times of about 50 minutes, irrespective of the degree of dehydration of the individual grains.

A fluidized bed drier, in which the fluidized bed consists of sand or of a different grainy material with a good heat transfer coefficient, which is inert to powdered gypsum is disclosed in German patent 3,721,421. By means of this method, gypsum particles are introduced into the fluidized bed so as to be uniformly distributed to absorb the heat from the fluidized bed of sand and from the fluidizing gas.

The fluidized bed of sand, as a means for transferring heat, is technically expensive compared to methods in which the fluidized bed at the same time is the fluidized material. A different fluidized bed method disclosed in German Auslegeschrift 2,622,994 provides a fluidized bed above a whirling bottom with air preheated to about 378° K. and a heat exchanger, which makes possible the dehydration of the produced gypsum in contact with the fluidized bed. It is a disadvantage of this method that the produced gypsum must be dried to a powder, before it is added. The material, heated to 445° to 465° K., must subsequently be cooled again over heat exchangers in the fluidized bed. This is technically expensive.

Various fluidized beds apparatuses and methods or for drying pastes and finely grained products are known, for example, from U.S. Pat. No. 4,581,830. References to complex process steps, that is, to drying, deagglomerating and dehydrating or calcining, generally are lacking. Modern, industrially-offered equipment or installations also effectuate the process steps of drying, deagglomerating and dehydrating or calcining with different apparatuses of different geometry.

It is an outstanding characteristic of all these known methods that, to attain the required degree of dehydration, material temperatures must be employed which lie in the range of 393° to 473° K. Aside from the dust precipitation equipment, several pieces of equipment are always used. A plurality of apparatuses and high temperatures are disadvantageous from an energy point of view.

German patent 2,727,544 discloses fluidized bed methods for drying and burning gypsum dihydrate to gypsum hemihydrate. These methods fulfill the task in one apparatus, but require conversion temperatures of 393° to 433° C.

SUMMARY OF THE INVENTION

The improvement over the already presented, known methods lies in the utilization of purified waste gases from heating thermal power plants and thermal power plants.

At high material temperatures and long residence times, there is a disadvantageous disintegration of crystallites. As a result of this, loosened crystallites have a high water demand and, with that, low strength. To improve the quality, the dehydration must then be followed by an expensive process of artificial aging or materials must be added which affect the binding times, strengths and crystallization.

It is an object of the present invention to provide a method for treating produced gypsum, and particularly flue gas desulfurization gypsum, so as to form highly active, modifiable gypsum binders of high strength. In the method, the course of the different steps of the process are organized in a complex and superimposed manner and a rapid dehydration is carried out with an energetically-advantageous thermal regime in such a manner that the crystalline structures of the flue gas desulfurization gypsum are retained.

Pursuant to the invention, this objective is accomplished by subjecting produced gypsum having a particle size of less than 200 $\mu$m to a dehydration which is commenced at a reduced pressure of 2.5 to 8 kpa at a material temperature of $\leq 363°$ K. and ended when the proportion of anhydrite III is 50% to 100% by weight, based on the dehydration product.

DESCRIPTION OF THE PREFERRED EMBODIMENTS

In accordance with the present the invention, conditions are created for simultaneous drying, deagglomeration and dehydration. To ensure a partial pressure difference, the conditions are such that the water vapor produced is constantly conducted away from the gypsum particles as soon as it is formed. The dehydration advantageously takes place at low temperatures, in order to avoid bursting of the crystallites as the water of crystallization leaves and to maintain the original size and shape of the crystallites as far as possible.

The retention of the crystallite size and shape results in advantageous conditions for separating the dehydration products, namely the hemihydrate as well as the anhydrite II, from the dihydrate during a pneumatic discharge from the reaction vessel by making use of their different densities. Thermal stresses and residence times of the individual grains are minimized by a concentration of these technological steps. Since the onset of dehydration processes in salts containing water of crystallization depends on the temperature and pressure, the onset of the dehydration of salts containing water of crystallization can be attained by reducing the pressure.

The material requirements are fulfilled in an advantageous manner if the flue gas desulfurization gypsum is supplied to a stirred fluidized bed and treated by a current of hot gas, introduced tangentially into a cylindrical reaction space. It is likewise advantageous if the method employs a fluidized bed which is agitated pneumatically. Control of the reduced pressure and the velocity of the gas in the reaction vessel, as well as the subsequent, continuous, pneumatic discharge of the dehydration product, are of decisive importance, in the method.

Further in accordance with the present invention, that the reduced pressure and the proportion by weight of anhydrite III at which the reaction proceeds or is ended are 4.5 kpa and 70% to 90% respectively. The objective of the invention is developed further pursuant to the invention, if up to 30% of the tail gas is returned to the current of hot gas. However, the method proceeds equally effectively when the current of hot gas supplied is kept free of portions of the tail gas. Pursuant to the present invention, it is advantageous if the milled natural gypsum has a broad range of particle sizes such that not more than 5% is retained on a 200 μm screen. According to a preferred aspect of the invention, up to 15% by weight of the flue gas desulfurization gypsum, up to 60% by weight of fly ash and up to 10% by weight of natural gypsum are added to the binder, which has a high content of anhydrite III.

Alternatively, these materials can be added individually or they can be added together in different parts by weight.

In a further embodiment of the present invention, it is advantageous if only modifying materials with pozzuolanic properties, such as fly ashes, slags, etc., are used.

In a meaningful development of the present invention, the product deposited from the waste gas stream at material temperatures of 333° to 353° K. consists almost completely of a highly reactive anhydrite III (heat of hydration > 180 J/g). The particle size and shape of the flue gas desulfurization gypsum, as determined by photographs taken with a scanning electron microscope, are largely the same before and after the dehydration. In the case of strewable quantities of ≧ 145 g, compression strengths of 8 N/mm² are attained after 2 hours. The curing times are short because of high reactivity with water. The dehydration process is controlled simply by means of the waste gas temperature and the pressure above the fluidized bed, which can be a stirred or a pneumatically agitated fluidized bed. Because the temperature of the material is low, cooling is not required. The dehydration product can be processed further immediately.

The material produced, which is rich in highly active anhydrite II, is very hygroscopic and has advantageously the ability to withdraw moisture as well as water of crystallization upon contact with moist hydrates.

In a further advantageous embodiment of the invention, the following reaction can take place upon addition of flue gas desulfurization gypsum:

$CaSO_4 \cdot 2H_2O + 3CaSO_4III \rightarrow 4CaSO_4 \cdot \frac{1}{2}H_2O$

$H_2O + 2CaSO_4III \rightarrow 2CaSO_4 \cdot \frac{1}{2}H_2O$

Depending on the moisture content, up to 15% by weight of produced gypsum can be added to the binder that is rich in anhydrite III.

When filter ash is added to the deposited dehydration product, the former is activated and a mixture with positive building material properties, such as high strengths at low bulk densities, is achieved. To improve the thermal efficiency, a portion of the waste gas can be recycled into the hot gas stream.

Hot-gas conditioning can also be employed to control the dehydration process. To influence the particle size spread of the dehydration product from produced gypsum, mixing can be carried out with selectively milled natural gypsum before or also after the dehydration, as has already been mentioned.

The present invention provides the possibility of producing highly active, modifiable gypsum binders of high strength from flue-gas desulfurization gypsum, while simultaneously drying, deagglomerating and dehydrating. The invention will be explained in greater detail by means of the following examples of the operation.

EXAMPLE 1

A paste-like flue-gas desulfurization gypsum was introduced by means of a forced feeder into a fluidized bed dryer with a mechanically-stirred fluidized bed and tangentially-entering hot gas as agitating gas.

Characteristic values of the flue-gas desulfurization gypsum:

|  | Material Retained by Screen | | |
| --- | --- | --- | --- |
|  | $R_{0.09}$ | $R_{0.063}$ | $R_{0.04}$ |
|  | 0.6% | 6% | 40% |
| mechanically bound water |  | 8-10% |  |
| water of crystallization |  | 19.6% |  |
| $SO_3$ |  | 44.3% |  |

The stream of hot gas was the heat carrier and served simultaneously for the reaction as well as for the pneumatic discharge of the dehydrated flue-gas desulfurization gypsum. The dust was precipitated in a cyclone or fabric separator. It is also possible to deposit the dust jointly by means of a cyclone and a fabric separator. The parameters for realizing the process were set to the following values:

| gas temperature at inlet to reactor: | 643° K. |
| --- | --- |
| gas temperature at outlet from reactor: | 431° K. |
| material temperature after reactor: | 338° K. |
| reduced pressure after reactor: | 4.5 Kpa |

The dehydration product, had the following characteristic values:

| water of crystallization (M₊ %) | 2.3 |
| --- | --- |
| strewable quantity (g/100/mL) | 147 |
| onset of setting (min) | 2 |
| end of setting (min) | 4 |
| compression strength after 2 hours (N/mm²) | 8.6 |
| bending strength after 2 hours (N/mm²) | 3.2 |
| bulk density after 2 hours (g/cc) | 1.63 |
| heat of hydration (J/g of sample) | 183 |

EXAMPLE 2

The procedure described in Example 1 was maintained for the starting product. Up to 15% by weight of flue-gas desulfurization gypsum was mixed in with the dehydration product.

EXAMPLE 3

The procedure described in Example 1 was maintained for the starting product. Up to 60% by weight of fly ash was added to the dehydration product.

EXAMPLE 4

A mixture, consisting of a paste-like flue-gas desulfurization gypsum and natural milled gypsum was introduced by means of a forced feeder into a fluidized bed dryer with a mechanically-stirred fluidized bed and tangentially-entering hot gas as agitating gas. The proportion of milled, natural gypsum was 10% by weight.

Characteristic values of the flue-gas desulfurization gypsum:

|  | Material Retained by Screen | | |
| --- | --- | --- | --- |
|  | $R_{0.09}$ | $R_{0.063}$ | $R_{0.04}$ |
|  | 0.6% | 6% | 40% |
| mechanically bound water |  | 8-10% |  |
| water of crystallization |  | 19.6% |  |
| $SO_3$ |  | 44.3% |  |

Characteristic values of natural gypsum:

|  | Material Retained by Screen | | |
| --- | --- | --- | --- |
|  | $R_{0.2}$ | $R_{0.09}$ | $R_{0.04}$ |
|  | 5% | 15% | 22% |
| mechanically bound water |  | 0.8% |  |
| water of crystallization |  | 18.5% |  |
| $SO_3$ |  | 43.2% |  |

Drying and dehydration were carried out under the same conditions as described in Example 1.

The parameters for the realization of the process were set as follows:

| gas temperature at inlet to reactor: | 653° K. |
| --- | --- |
| gas temperature at outlet from reactor: | 439° K. |
| material temperature after reactor: | 351° K. |
| reduced pressure after reactor: | 4.5 Kpa |

The dehydration product had the following characteristic values:

| water of crystallization (M-%) | 2.8 |
| --- | --- |
| strewable quantity (g/100/mL) | 140 |
| onset of setting (min) | 2 |
| end of setting (min) | 4 |
| compression strength after 2 hours (N/mm²) | 7.1 |
| bending strength after 2 hours (N/mm²) | 3.1 |
| bulk density after 2 hours (g/cc) | 1.61 |
| heat of hydration (J/g of sample) | 186 |

We claim:

1. A method for treating flue-gas desulfurization gypsum, comprising dehydrating said gypsum having a particle size of less than 200 μm in a fluidized bed to form a calcium sulfate binder, said dehydrating including conducting dehydration at a reduced pressure ranging from 2.5 to 8 kpa and at a material temperature ranging from 333° to 363° K., and ending said dehydration when anhydrite III is present in said calcium sulfate binder in an amount ranging from 50% to 100% by weight of total dehydration product to provide a calcium sulfate binder rich in anhydrite III.

2. The method of claim 1 wherein said reduced pressure is 4.5 kpa.

3. The method of claim 1 wherein said carried out at a material temperature of 353° K.

4. The method of claim 1 wherein said dehydration is ended when said anhydrite III constitutes 70% to 90% by weight.

5. The method of claim 1, further comprising admixing up to 10% of natural gypsum with said calcium sulfate binder.

6. The method of claim 5, wherein said natural gypsum is milled and has a wide particle size distribution with a maximum retention of 5% on a 200 μm screen.

7. The method of claim 1, further comprising removing steam formed during said dehydration immediately after said steam is formed.

8. The method of claim 1, further comprising adding up to 15% by weight of fluegas desulfurization gypsum to said calcium sulfate binder binder.

9. The method of claim 1, further comprising adding up to 60% by weight of fly ash to said calcium sulfate binder.

10. The method of claim 1, further comprising adding up to 15% by weight of fluegas desulfurization gypsum and up to 60% by weight of fly ash to the said calcium sulfate binder.

11. The method of claim 1, further comprising adding to said binder materials having pozzuolanic properties.

12. The method of claim 1, further comprising using a mechanically stirred fluidized bed as said fluidized bed.

13. The method of claim 1, further comprising using a separate gas stream to agitate said fluidized bed in addition to the fluidizing gas.

14. The method of claim 1, further comprising dehydrating said produced gypsum by introducing a hot gas stream into said fluidized bed, and recycling up to 30% fluidization tail gas into said hot gas stream.

* * * * *